United States Patent
Ohashi et al.

[11] Patent Number: 5,430,088
[45] Date of Patent: Jul. 4, 1995

[54] RUBBER COMPOSITION

[75] Inventors: Masayuki Ohashi; Tomohiro Kusano, both of Tokyo, Japan

[73] Assignee: Bridgestone Corporation, Tokyo, Japan

[21] Appl. No.: 187,481

[22] Filed: Jan. 28, 1994

[30] Foreign Application Priority Data

Jan. 29, 1993 [JP] Japan .................. 5-013677
Jan. 21, 1994 [JP] Japan .................. 6-005279

[51] Int. Cl.$^6$ .................. C08K 3/04; C01B 31/00
[52] U.S. Cl. .................. 524/496; 524/495; 423/445 R; 423/450
[58] Field of Search .................. 524/496, 495; 423/445 R, 450

[56] References Cited

U.S. PATENT DOCUMENTS

| | | | |
|---|---|---|---|
| 5,093,407 | 3/1992 | Komai et al. | 524/495 |
| 5,100,637 | 3/1992 | Nakai | 524/496 |
| 5,124,396 | 6/1992 | Branan, Jr. et al. | 524/496 |
| 5,321,072 | 6/1994 | Misono | 524/496 |

FOREIGN PATENT DOCUMENTS 2635108 9/1990 France .................. 423/445
62104850 of 1985 Japan .

*Primary Examiner*—Paul R. Michl
*Assistant Examiner*—Olga Asinovsky
*Attorney, Agent, or Firm*—Sughrue, Mion, Zinn, Macpeak & Seas

[57] ABSTRACT

A rubber composition including 100 parts by weight of natural rubber and/or diene synthetic rubber and 30-100 parts by weight of carbon black having the following characteristics:

(1) 24M4DBP of 0.95-1.30 ml/g;
(2) $D_{st}$ of 50-80 nm;
(3) $\Delta D_{50}/D_{st}$ of 0.55-0.75;
(4) $\Delta D_{10}/D_{st}$ of 1.0-1.5;
(5) a component ratio of 20% or less; and
(6) CTAB of 120-180 m$^2$/g.

The rubber composition is excellent in abrasion resistance without compromising low heat generation property and processability thereof.

9 Claims, 2 Drawing Sheets

RUBBER COMPOSITION

BACKGROUND OF THE INVENTION

1. Field of the Invention

The present invention relates to a rubber composition suitable for use as a tire and, more particularly, to a rubber tire composition having improved abrasion resistance, and being especially suitable for use as a truck tire or a bus tire.

2. Description of the Background Art

Heretofore, the use of ISAF-grade carbon black as a highly reinforcing packing for rubber has been well known. Recently, however, there has been a great demand for carbon black which is capable of improving abrasion resistance of a tire, especially a pneumatic tire which experiences heavy loading, due to improved durability of a tire carcass and the desire to conserve natural resources.

The grade of carbon black which is used as a reinforcing agent of a rubber composition for a tire tread used for heavy loading has been changed from ISAF-grade to SAF-grade. This is because SAF-grade carbon black particles are finer than those of ISAF-grade. In general, when carbon black is compounded into rubber to improve abrasion resistance, it is desirable to use a finely divided carbon black. However, even if the carbon black particles are finer than SAF-grade particles, abrasion resistance is not necessarily improved since the dispersibility of the carbon black in the compounded rubber is remarkably lowered.

In order to improve abrasion resistance, various investigations have been conducted focusing on the colloidal characteristics of carbon black. Japanese Patent Application Laid-Open No. Sho 62-290738, for example, discloses a method for improving abrasion resistance by controlling aggregate distribution of carbon black. However, even this method does not achieve satisfactory abrasion resistance to a level demanded at the present time.

In addition, by narrowing the aggregate distribution, abrasion resistance is not remarkably improved and reaches a limit.

SUMMARY OF THE INVENTION

An object of the present invention is to provide a rubber composition suitable for use as a tread, the rubber composition having improved abrasion resistance and being suitable for use as a tire, especially a truck tire or a bus tire without compromising the low heat generation property of the tire and processability of the rubber composition.

The present inventors have studied the relationship between the characteristics of carbon black and tire performance to solve the above-mentioned problems and found that abrasion resistance of a rubber composition can be improved to a great extent by compounding therewith carbon black having certain characteristics.

Thus, the present invention provides a rubber composition including 100 parts by weight of one or more rubber components, the rubber components being natural rubber and/or diene-type synthetic rubber, and 30–100 parts by weight, more preferably 40–80 parts by weight of carbon black having the following characteristics:

(i) 24M4DBP of 0.95–1.30 ml/g;
(ii) $D_{st}$ of 50–80 nm;
(iii) $\Delta D_{50}/D_{st}$ of 0.55–0.75;
(iv) $\Delta D_{10}/D_{st}$ of 1.0–1.5;
(v) component ratio of 20% or less; and
(vi) CTAB of 120–180 m²/g wherein 24M4DBP, $D_{st}$, $\Delta D_{50}$, $D_{10}$, the component ratio and CTAB are as defined below in connection with FIG. 1.

In one embodiment of the invention, where both the natural rubber and the diene-type synthetic rubber are both present as the rubber component, the diene synthetic rubber is present in an amount of 10–80 parts by weight, more preferably 10–60 parts by weight, based upon 100 parts by weight of natural rubber.

DESCRIPTION OF THE PREFERRED EMBODIMENTS

The present invention is explained in greater detail hereafter.

By the term "24M4DBP" as used in the present invention is meant the amount of dibutyl phthalate (DBP) oil absorbed by the carbon black which has been crushed four times at a pressure of 24,000 psi. In other words, 24M4DBP is an indication used when the DBP oil absorption is determined based on the structural form of a real, non-destructive structure (a primary structure) excluding DBP oil absorption due to a deformed and destructive structure (a secondary structure) caused by so-called van der Waals force, and it is also an indication evaluating the skeleton structure characteristics of carbon black having mainly a primary structure. 24M4DBP may be measured pursuant to ASTMD3493, the disclosure of which is herein incorporated by reference.

By the term "$D_{st}$" (nm), as used in the present invention, is meant (with reference to FIG. 1) a value representing the most probable value, that is, the most probable aggregate diameter, in terms of Stokes corresponding diameter for an aggregate distribution of carbon black in accordance with the present invention.

$D_{st}$ may be measured by a centrifugal sedimentation method using a disk centrifuge apparatus manufactured by the Joyce Leble Company (Gateshead, England). In such a method, dried carbon black is first weighed precisely and is mixed with a 20% aqueous ethanol solution containing a small amount of surface-active agents in order to prepare a dispersed system having a 50 mg/l carbon black concentration. The system is sufficiently dispersed by supersonic waves and then used as a sample solution.

The revolution of the disk centrifuge may be set at 6000 rpm and after adding 10 ml of a spin liquid (2% aqueous glycerin solution) to the sample solution, 1 ml of a buffer solution (an aqueous ethanol solution) is poured therein.

Subsequently, after injecting 0.5 ml of the sample with a syringe, centrifugal sedimentation is begun all at once. By the use of a photoelectric sedimentation method, a formed aggregate distribution curve may be drawn as shown in FIG. 1 and a Stokes corresponding diameter corresponding to a peak of the curve is defined as $D_{st}$(nm).

Figure 1:
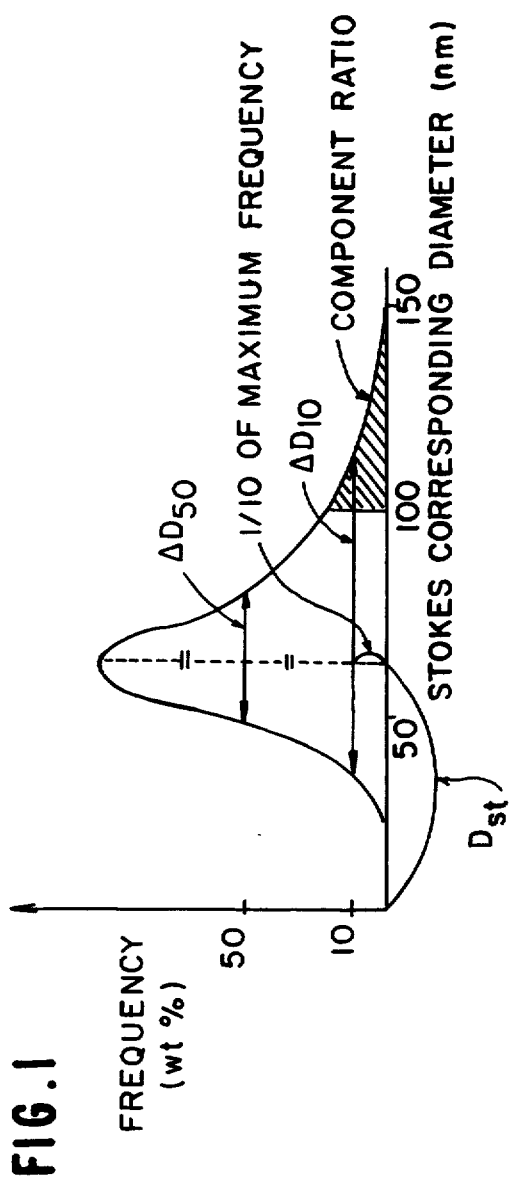
FIG. 1 is a graph of an aggregate distribution of carbon black particles in accordance with the present invention in which the Stokes corresponding diameter of carbon black aggregates is plotted on the abscissa of the graph and the frequency of the presence of the carbon black aggregates, i.e., the amount of carbon black aggregates having a certain Stokes corresponding diameter, in terms of weight percent, is plotted on the ordinate of the graph. This graph shows the most probable value $D_{st}$ of the Stokes corresponding diameter, the half-width $\Delta D_{50}$, the 10% width $\Delta D_{10}$, and the component ratio (as a hatched area), for the carbon black used in the present invention, as will be discussed below.

By the term "$\Delta D_{50}$", as used in the present invention, is meant (with reference to FIG. 1) the width in Stokes corresponding diameter (nm) of the distribution curve at a 50% frequency position, and by the term "$\Delta D_{10}$", as used in the present invention, is meant the width of the distribution curve in Stokes corresponding diameter (nm) at the 10% frequency position (see FIG. 1). In other words, $\Delta D_{50}$ represents a difference in Stokes corresponding diameter between the two points on the distribution curve corresponding to a 50%, and $\Delta D_{10}$ similarly represents a difference in Stokes corresponding diameter between the two points on the distribution curve corresponding to a 10% frequency.

By the term "component ratio," in accordance with the present invention, is meant (with reference to FIG. 1) the ratio of the hatched area under the distribution curve to the whole area under the distribution curve, the hatched area representing carbon black aggregates having a Stokes corresponding diameter of at least 100 nm.

With regard to CTAB, it must be recognized that although a nitrogen adsorption method usually employed in connection with specific surface area measurement of carbon black is a good evaluation method, carbon black has several Å-diameter fine pores over a large part of all of the surface area thereof. Thus, rubber can not penetrate into the pores. Therefore, evaluation of the specific surface area of the pores which rubber may penetrate into may be carried out by the use of a so-called "large adsorption molecule," such as cetyltrimethylammonium bromide.

By the term "CTAB," in accordance with the present invention, is meant evaluation of the specific surface area of fine pores in carbon black into which rubber may penetrate, and is indicated in terms of m²/g.

Carbon black according to the present invention can be produced using a conventional oil furnace. One suitable method is discussed below. Other furnaces and methods will be apparent to one skilled in the art.

A raw material having a uniform composition may be sprayed into a narrow region in a reaction furnace using a nozzle capable of narrowing an oil drop distribution. The temperature in the furnace may be set at a high temperature, i.e., about 1800° C. at the inner side of the furnace wall, and kept uniform so as to optimize the production of fine particle size carbon black. Also, by narrowing further the combustion gas flow distribution, the reaction time can be reduced and made uniform.

As mentioned above, $D_{st}$ of the carbon black in accordance with the invention is in the range of 50–80 nm.

When $D_{st}$ is less than 50 nm, operability and the low heat generation property of the tire tread composition deteriorate remarkably. On the other hand, when $D_{st}$ is more than 80 nm, little improvement of abrasion resistance is achieved. $D_{st}$ preferably ranges from 55 to 70 nm.

$\Delta D_{50}/D_{st}$ is related to the unevenness of the aggregate distribution of the carbon black, i.e., whether the peak of the distribution curve is sharp or broad. As the value of $\Delta D_{50}/D_{st}$ becomes smaller, the uniformity of carbon black increases and the reinforcing effect of the carbon black in the rubber composition rises. However, when the value of $\Delta D_{50}/D_{st}$ is less than 0.55, operability and the low heat generation property of the rubber composition deteriorate remarkably. On the other hand, when $\Delta D_{50}/D_{st}$ is more than 0.75, there is little improvement in abrasion resistance. Therefore, $\Delta D_{50}/D_{st}$ of the carbon black in accordance with the invention is in the range of 0.55–0.75, more preferably 0.6–0.7.

Moreover, the present inventors have investigated in detail the aggregate distribution of carbon black as shown in FIG. 1 and found that even if $\Delta D_{50}/D_{st}$ is in the above-mentioned range, the "original uniformity" of the distribution curve is not maintained, i.e., the lower part of the aggregate distribution curve is broadened at a region of large values of Stokes corresponding diameter focusing on abrasion in particular. While not wishing to be bound by theory, it is believed that this phenomenon is due to two things:

(1) broadening of the distribution curve between a ½ value of the maximum frequency and 1/10 value thereof; and (2) "tailing" to a large-size-particle side of the distribution curve at a lower part thereof as shown in a hatched area of FIG. 1.

In order to maintain the original uniformity of the distribution curve, $\Delta D_{10}/D_{st}$ of the carbon black in accordance with the present invention is in the range of 1.0–1.5, preferably 1.1–1.4. When $\Delta D_{10}/D_{st}$ is less than 1.0, workability and the low heat generation property of the rubber composition deteriorate remarkably. When $\Delta D_{10}/D_{st}$ exceeds 1.5, little improvement of abrasion resistance is achieved.

In order to avoid tailing of the distribution curve, it is necessary that the component ratio be 20% or less, preferably 15% or less. When the component ratio is more than 20%, little improvement of abrasion resistance is achieved.

Further, it is preferable that CTAB be in the range of 120–180 m²/g. If the value of CTAB is less than 120 m²/g, little improvement of abrasion resistance is achieved. On the other hand, when the value of CTAB is more than 180 m2/g, the low heat generation property and workability of the rubber composition deteriorate remarkably.

The rubber component employed in the present invention may be selected from natural rubber and diene synthetic rubber. If both natural rubber and diene synthetic rubber are used in the present invention, it is preferable that the amount of diene synthetic rubber be in the range of 10–80 parts by weight, more preferably 10–60 parts by weight, based on 100 parts by weight of the natural rubber.

Any suitable diene synthetic rubber may be used in the present invention. For example, the diene synthetic rubber may be styrene-butadiene rubber, isoprene rubber, butadiene rubber and the like. Other diene synthetic rubber will be apparent to one skilled in the art.

The compounding amount of carbon black in accordance with the present invention is in the range of 30–100 parts by weight based on 100 parts by weight of the rubber component. When the amount of carbon black is less than 30 parts by weight, sufficient abrasion resistance cannot be obtained. On the contrary, when the amount exceeds 100 parts by weight, the workability of the resulting rubber composition deteriorates remarkably, and dispersion of the carbon black in the rubber composition cannot be sufficiently attained and therefore, abrasion resistance is also deteriorated. Preferably, the carbon black is present in the rubber composition in an amount of 40–80 parts by weight based upon 100 parts by weight of the rubber component.

The rubber composition according to the present invention may further contain an inorganic filler, such as silica, a vulcanizer, a vulcanizing accelerator, a softener and an antioxidant, each of which being added in an amount conventionally used in the rubber industry.

According to the present invention, a pneumatic tire having a tread which includes the rubber composition of the present invention simultaneously and considerably improves the rolling resistance and wear resistance of the tire without compromising workability when producing the pneumatic tire.

The present invention is explained in greater detail hereinafter by reference to specific examples, but the invention is not to be construed as being limited by the following examples. All percentages stated herein are weight percentages unless otherwise stated.

EXAMPLES

Carbon blacks in accordance with the present invention (designated A–C) and carbon blacks for comparison purposes (designated D–G) were produced as shown below.

Figure 2:
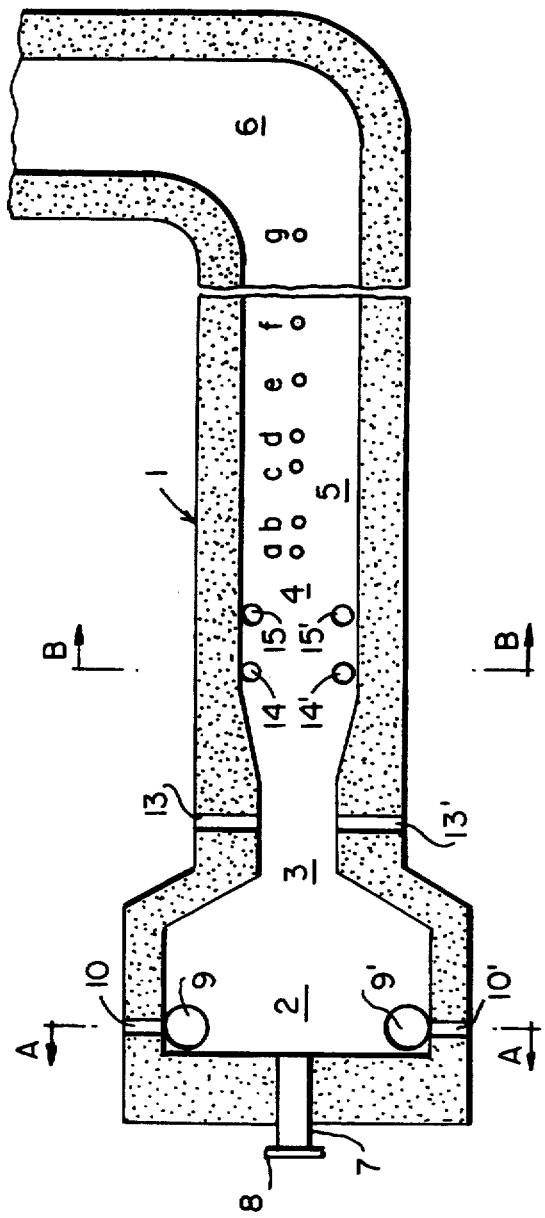
FIG. 2 is a schematic, longitudinal, cross-sectional view of an apparatus which may be employed to produce carbon black suitable for use in the present invention. Carbon black for comparative purposes was also prepared in the apparatus shown in FIG. 2, as will be discussed below.
Figure 4:
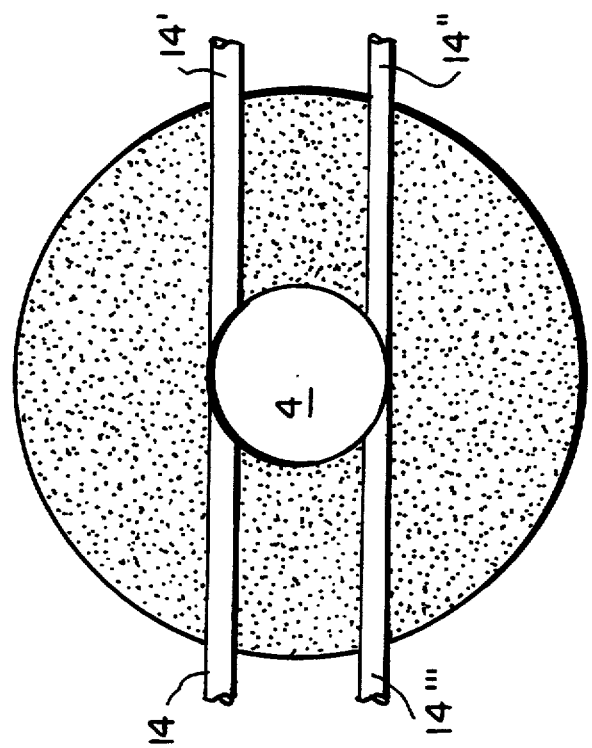
FIG. 4 is a schematic, cross-sectional view of the apparatus along line B—B in FIG. 2.
Figure 3:
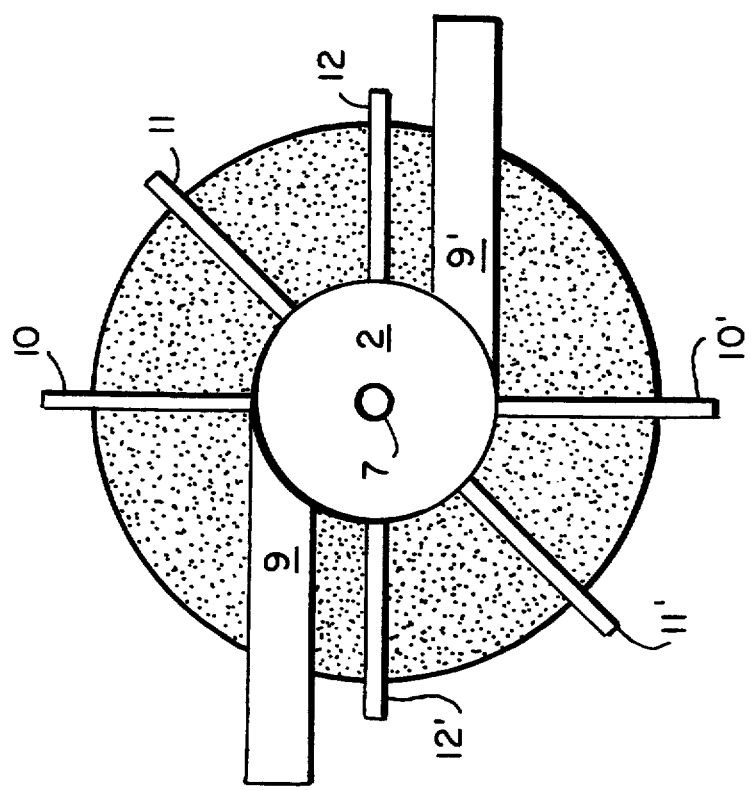
FIG. 3 is a schematic, cross-sectional view of the apparatus along line A—A in FIG. 2.

Carbon blacks A–G were produced using the manufacturing apparatus shown in FIGS. 2, 3 and 4. Referring now to FIGS. 2, 3 and 4, wherein like numbers illustrate like elements, carbon black manufacturing apparatus 1 includes combustion gas filling chamber 2, Venturi portion 3, reaction chamber 4 and reaction continuation and rapid cooling chamber 5. Further, a gas flue 6 is provided as is an opening 7 and inspection window 8. Gas inlets 9, 9', fuel fluid inlets 10, 10', 11, 11', 12, 12' (see FIG. 3), inlets 13, 13', and gas inlets 14–14''' (see FIG. 4) and 15–15''' are also provided in apparatus 1. Although not shown, inlets 15–15''' may be arranged in a manner similar to inlets 14–14'''. Insertion openings a–g are provided in apparatus 1 for cooling water-forcing spray apparatus.

The dimensions and locations of each of the components of the manufacturing apparatus (1) may be as follows:

| | |
|---|---|
| Combustion gas filling chamber (2) | |
| inside diameter | 420 mm |
| length | 230 mm; |
| Oxygen-containing gas inlet (9, 9') | |
| inside diameter | 80 mm |
| center position | 50 mm from the front end; |
| Fuel fluid inlets (10–12') | |
| inside diameter | 6 mm |
| six inlets were located at regular intervals; | |
| Venturi portion (3) | |
| entrance length | 100 mm |
| diameter at the narrowest position | 140 mm |

| | |
|---|---|
| -continued | |
| exit length | 150 mm; |
| Reaction chamber (4) | |
| diameter | 200 mm; |
| Gas inlet (14–14''' and 15–15''') | |
| diameter | 50 mm |
| center position | 50 mm and 150 mm; and |
| Crude oil inlets (13–13'') | |
| diameter | larger than those of spray nozzles |
| center position | anywhere in Venturi portion (3) |

If desired, a natural gas may be introduced into chamber (2) during the formation of the carbon black by an introduction pipe having a diameter of 13 mm located, for example, at a center of inlets 9–9'.

Spray apparatus for introducing cooling water may be located at openings a–g in the reaction continuation and rapid cooling chamber (5) situated downstream of reaction chamber (4).

Stock oil having the characteristics and composition shown in Table 1 may be used to prepare the carbon black in accordance with the present invention.

TABLE 1

| | | | | |
|---|---|---|---|---|
| Specific gravity (JIS K2249) | (15/ 4° C.) | 1.1319 | Distillation Characteristic I.B.P. 188 | (°C.) |
| Kinematic viscosity (JIS K2283) | (cst at 50° C.) | 26.7 | (Initial Boiling Point) | |
| Water content (JIS K2275) | (%) | 0.5 | 10% | 239 |
| Residual carbon (JIS K2270) | (%) | 11.6 | 30% | 292 |
| Sulfur content (JIS K2273) | (%) | 0.4 | 50% | 339 |
| Carbon content | (%) | 90.1 | | |
| Hydrogen content | (%) | 5.4 | | |
| BMCI | | 160 | | |

*BMCI: Bureau of Mines Correlation Index

Natural gas including 86.3 vol. % methane, 7.3 vol. % ethane, 3.1 vol. % propane and 3.3 vol. % others was used as a fuel fluid.

In the manufacturing of carbon black in accordance with the invention, the characteristics thereof may generally be controlled by the following:

CTAB is measured by following ASTM-3765-89. The value of CTAB may be controlled by varying the ratio of the whole amount of hydrocarbons to the whole amount of air introduced in the furnace. The CTAB value of the carbon black increases when the whole amount of air is increased.

The value of 24M4DBP may be controlled by varying the amount of $K^+$ contained in the stock oil. 24M4DBP decreases when the amount of $K^+$ added to the stock oil is increased.

The aggregate distribution may be controlled by introducing a revolving flow of gas into the reaction chamber so as to suppress the occurrence of large aggregates, wherein the combustion flow and the revolving direction were the same as those of upstream side. As a result, the amount of carbon black aggregates having a size of 100 nm or more were especially reduced. However, this amount is decreased when the position of the introduction of the revolving flow of gas is moved downstream.

The diameter of oil particles in the furnace apparatus may be decreased by increasing the introduction pressure of the stock oil and by making the diameter of the oil introducing nozzles small. In this manner, the diameter of sprayed particles is reduced and the distribution thereof was narrowed.

In accordance with the above-mentioned controlling conditions, carbon blacks A–C of the present invention and carbon blacks D–F for comparison purposes were produced under the manufacturing conditions shown in Table 2, and the characteristics of the carbon blacks are shown in Table 3, respectively.

Carbon black G is commercially available as Mitsubishi Kasei DIA-A and $\Delta D_{50}/D_{st}$, $\Delta D_{10}/D_{st}$ and the component ratio of carbon black G are very different from those of carbon blacks employed in the present invention.

Table 5 shows examples of rubber compositions in accordance with the invention and comparative examples of rubber compositions. The basic compounding formula of ingredients of the examples and comparative examples was as follows:

TABLE 2

| Manufacturing conditions | Examples | | | | | | |
|---|---|---|---|---|---|---|---|
| | A | B | C | D | E | F | G |
| Supply amount of stock oil (l/h) | 307 | 307 | 352 | 323 | 295 | 279 | — |
| Number of spray nozzles for stock oil | 2 | 2 | 3 | 3 | 3 | 3 | — |
| Diameter of spray nozzles for stock oil (mm) | 1.0 | 1.0 | 1.0 | 1.2 | 1.2 | 1.1 | — |
| Spray pressure of stock oil (kg/cm$^2$) | 35 | 35 | 30 | 20 | 20 | 25 | — |
| Preheating temperature of stock oil (°C.) | 230 | 230 | 210 | 180 | 180 | 210 | — |
| Amount of air introduced into combustion chamber (kg/h) | 1699 | 1699 | 1699 | 2240 | 2240 | 1770 | — |
| Amount of NG* introduced into combustion chamber (kg/h) | 72 | 72 | 72 | 81 | 81 | 51 | — |
| Whole amount of air introduced into reaction chamber (kg/h) by: | 451 | 451 | 451 | 0 | 0 | 470 | — |
| Inlet No. 1 | 451 | 451 | 0 | 0 | 0 | 0 | — |
| Inlet No. 2 | 0 | 0 | 451 | 0 | 0 | 470 | — |
| Whole amount of NG introduced into reaction chamber (kg/h) by: | 19 | 19 | 19 | 0 | 0 | 14 | — |
| Inlet No. 1 | 19 | 19 | 0 | 0 | 0 | 0 | — |
| Inlet No. 2 | 0 | 0 | 19 | 0 | 0 | 14 | — |
| Amount of K$^+$ (based on stock oil, PPM) | 18 | 15 | 14 | 14 | 19 | 19 | — |
| Distance of the position of the cooling water spray from the position of stock oil spray, mm | 1500 | 1500 | 1600 | 1500 | 1500 | 1400 | — |

*NG: Natural gas

TABLE 3

| Characteristics of carbon black | Examples | | | | | | |
|---|---|---|---|---|---|---|---|
| | A | B | C | D | E | F | G |
| CTAB (m$^2$/g) | 141 | 141 | 132 | 142 | 147 | 157 | 124 |
| 24M4DBP (ml/100 g) | 105 | 109 | 110 | 110 | 104 | 104 | 100 |
| Dst (nm) | 59 | 65 | 71 | 62 | 57 | 57 | 75 |
| $\Delta D_{50}$/Dst | 0.61 | 0.66 | 0.69 | 0.64 | 0.65 | 0.63 | 0.79 |
| $\Delta D_{10}$/Dst | 1.36 | 1.29 | 1.32 | 1.70 | 1.94 | 1.33 | 1.75 |
| Component ratio (%) | 9.6 | 8.5 | 16.5 | 28.5 | 29.7 | 22.4 | 32.1 |

Table 3 shows the characteristic of carbon blacks in accordance with invention and comparative carbon black. The samples of carbon black designated A–C correspond to carbon blacks representing the present invention and the samples of carbon black designated D–G correspond to comparative carbon blacks.

The comparative carbon blacks have the following characteristics. The value of $\Delta D_{50}/D_{st}$ and the component ratio of carbon blacks D and E were more than 1.5 and 20%, respectively. The value of $\Delta D_{10}/D_{st}$ and the component ratio of carbon black F were less than 1.5 and more than 20%, respectively.

| natural rubber | 100.0 parts by weight; |
| carbon black | 50.0 parts by weight; |
| stearic acid | 2.0 parts by weight; |
| zinc white | 4.0 parts by weight; |
| antioxidant | 2.0 parts by weight; |
| vulcanization accelerator | 1.0 parts by weight; |
| sulfur | 1.5 parts by weight; | where the antioxidant was N-(1,3-dimethylbutyl)-N'-phenyl-P-phenylenediamine and the vulcanization accelerator was N-cyclohexyl-2-benzothiazylsulfenamide.

A Mooney viscosity test based on JIS K 6300-1974 was carried out and the following formula was used for calculation:

Mooney viscosity index=(the Mooney value of a test sample)/(the Mooney value of a sample of Comparative Example 1)

The smaller the Mooney viscosity index, the better the workability.

As far as an abrasion resistance test is concerned, first, a TBR 10,00 R 20 tire was manufactured and after 30,000 km of driving, the depth of the remaining tire tread was measured to determine the amount of abrasion (mm) using the following formula:

Abrasion resistance index=(mileage of the test tire/the amount of abrasion)/(mileage of the tire of Comparative Example 1/the amount of abrasion)

The larger the abrasion resistance index, the better the abrasion resistance.

A heat generation test was carried out using a spectrometer manufactured by TOYOSEIKI at a dynamic strain amplitude of 1%, a frequency of 52 Hz, a measurement temperature of 25° C., and tan $\delta$ was determined by the following formula:

Heat generation index=(tan $\delta$ of a test sample)/(tan $\delta$ of a test sample of Comparative Example 1)

The smaller the heat generation index, the better the low heat generation property, that is, the lower the calorific value.

Vulcanization of a sample for a rubber physical properties test was carried at 145° C. and 35 minutes.

consisting of natural rubber, diene synthetic rubber and mixtures thereof, and 30–100 parts by weight of carbon black having the following characteristics:

(a) 24M4DBP of 0.95–1.30 ml/g;
(b) $D_{St}$ of 50–80 nm;
(c) $\Delta D_{50}/D_{St}$ of 0.55–0.75;
(d) $\Delta D_{10}/D_{St}$ of 1.0–1.5;
(e) a component ratio of 20% or less; and
(f) CTAB of 120–180 m$^2$/g wherein 24M4DBP represents the amount of dibutyl phthalate oil absorbed by the carbon black which has been crushed four times at a pressure of 24,000 psi, $D_{St}$ represents the most probable Stokes corresponding diameter of aggregates of the carbon black, $\Delta D_{50}$ and $\Delta D_{10}$ are as shown in the aggregate distribution curve of the carbon black of FIG. 1, component ratio represents the ratio of the area under the aggregate distribution curve of FIG. 1 corresponding to a Stokes corresponding diameter of at least 100 nm to the whole area under the distribution curve and CTAB represents the specific surface area of pores in the carbon black capable of having the rubber component penetrate therein.

2. The rubber composition according to claim 1, wherein the rubber component includes both the natural rubber and the diene synthetic rubber, the diene synthetic rubber being present in an amount of 10–80 parts by weight based upon 100 parts by weight of natural rubber.

3. The rubber composition according to claim 1, wherein the $\Delta D_{St}$ is 55–70 nm.

4. The rubber composition according to claim 1, wherein the $\Delta D_{50}/D_{St}$ is 0.6–0.7.

TABLE 4

|  | Examples | | | | | Comparative Examples | | | | | |
|---|---|---|---|---|---|---|---|---|---|---|---|
|  | 1 | 2 | 3 | 4 | 5 | 1 | 2 | 3 | 4 | 5 | 6 |
| Carbon black used | A | B | C | A | B | D | E | F | G | D | F |
| Natural rubber (part by weight) | 100 | 100 | 100 | 70 | 70 | 100 | 100 | 100 | 100 | 70 | 70 |
| cis-1,4 polybutadiene (part by weight) | — | — | — | 30 | 30 | — | — | — | — | 30 | 30 |
| Carbon black (part by weight) | 50 | 50 | 50 | 50 | 50 | 50 | 50 | 50 | 50 | 50 | 50 |
| Mooney viscosity index | 102 | 100 | 100 | 105 | 104 | 100 | 127 | 96 | 92 | 104 | 108 |
| Low heat generation property index | 92 | 94 | 90 | 87 | 86 | 100 | 94 | 104 | 94 | 96 | 103 |
| Abrasion resistance index | 110 | 109 | 107 | 111 | 112 | 100 | 100 | 101 | 90 | 104 | 105 |

As shown in Examples 1–5, the rubber compositions containing carbon blacks A–C representing the present invention have better abrasion resistance without deteriorating the low heat generation property and processability than the rubber composition of Comparative Examples 1–6 containing conventional carbon blacks.

While the invention has been described in detail and with reference to specific embodiments thereof, it will be apparent to one skilled in the art that various changes and modifications can be made therein without departing from the spirit and scope thereof.

What is claimed is:

1. A rubber composition, comprising 100 parts by weight of a rubber component selected from the group 5. The rubber composition according to claim 1, wherein $\Delta D_{10}/D_{St}$ is 1.1–1.4.

6. The rubber composition according to claim 1, wherein the component ratio is 15% or less.

7. The rubber composition according to claim 1, wherein the diene synthetic rubber is selected from the group consisting of styrene-butadiene rubber, isoprene rubber and butadiene rubber.

8. The rubber composition according to claim 1, wherein the rubber component is natural rubber.

9. The rubber composition according to claim 1, wherein the rubber component is diene synthetic rubber.

* * * * *